Nov. 2, 1965     H. KLING     3,214,914
BRAKE MASTER CYLINDER CONSTRUCTION
Filed Oct. 21, 1964
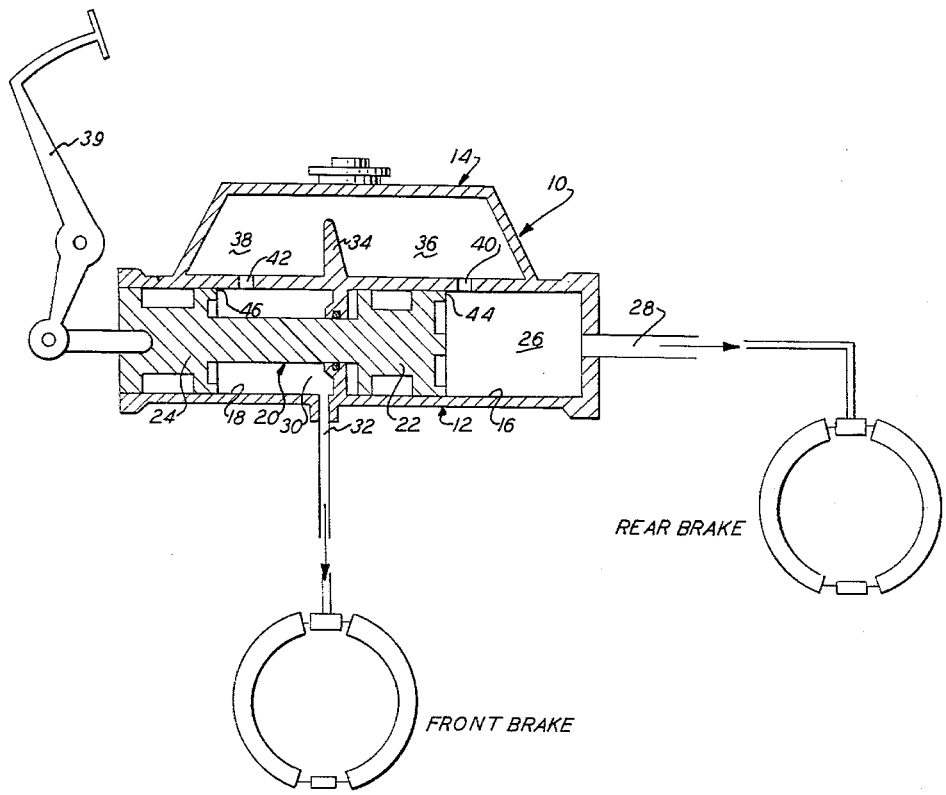
HANS KLING
INVENTOR
BY John R. Faulkner
Clifford L. Sadler
ATTORNEYS 3,214,914
BRAKE MASTER CYLINDER CONSTRUCTION
Hans Kling, Cologne-Lidenthal, Germany, assignor to Ford Motor Company, Dearborn, Mich., a corporation of Delaware
Filed Oct. 21, 1964, Ser. No. 405,434
2 Claims. (Cl. 60—54.6)

This invention relates generally to brake master cylinders, and more particularly to a brake master cylinder construction that is adapted to avoid brake squeaking noises at the front wheel brakes.

Brake noises often appear at front wheel brakes because of their higher self-energizing effect in comparison with the rear wheel brakes. A shift in weight from the rear to the front wheels during brake application causes this result. One particular noise that is especially annoying is the squeaking that occurs just prior to the time the vehicle is brought to a stop when only a light pressure is being applied to the brake pedal.

According to the present invention, this squeaking of the front wheel brakes as the vehicle is rolling slowly to a halt is avoided by a construction of the brake master cylinder in which the front wheel brake is conditioned to be ineffective at low brake pedal pressures.

In one particular embodiment of this inventive concept, the objects are achieved by using two main brake pistons instead of one in the master cylinder. The two pistons may be arranged parallel to each other or in a tandem manner. They are adapted to activate their respective pressure chambers in a consecutive manner rather than simultaneously. Therefore, upon depression of the brake pedal the main brake piston belonging to the front wheel brake system becomes effective some moments later than the main brake piston belonging to the rear wheel brake system. Thus, in a situation calling for only light pressure on the brake pedal, the front wheel brakes are not in use.

Further details of the presently preferred construction will become more apparent upon consideration of the following detailed discussion and the accompanying drawing in which a brake master cylinder incorporating the present invention is disclosed.

The brake master cylinder assembly 10 includes a cylinder body 12 and a reservoir chamber 14. The cylinder body 12 contains a first cylinder bore 16 and a second cylinder bore 18 that are coaxially aligned. A tandem piston assembly 20 having a first piston portion 22 and a second piston portion 24 is slideable within the bores 16 and 18.

The first piston 22 and the bore 16 defines a portion of a first pressure chamber 26. An outlet 28 extends from the chamber 26 and is connected to the rear wheel brakes.

The second piston 24 sliding in the bore 18 defines a portion of the second pressure chamber 30. Outlet line 32 extends from the second pressure chamber 30 and is connected with the front wheel brakes.

The reservoir chamber 14 is divided by a partition 34 into first and second chamber portions 36 and 38, respectively. The first reservoir chamber portion 36 communicates with the first pressure chamber 26 of bore 16 by means of a port 40. A port 42 connects the second reservoir chamber 38 with the second pressure chamber 30.

The piston assembly 20 is slideable in the cylinder 12 upon application of pressure to a brake pedal 39. Such pressure causes the piston assembly 20 to move to the right and thereby to expel fluid from the first and second pressure chambers 26, 30 through the outlets 28, 32 to the rear and front wheel brakes. When the piston assembly 20 moves to the right, its piston elements 22 and 24 seal off the ports 40 and 42.

The first piston 22 is of generally spool shape having a leading edge 44 in sealed contact with the wall of the bore 16. When the piston is at a static position as illustrated in the drawing, the leading edge 44 is spaced from the port 40. When the brakes are applied, the piston seals port 40 to force fluid out connection 28. Similarly, the second piston 24 is provided with a leading edge 46 that is spaced from the port 42. It is to be noted from the drawing that the space between the first piston leading edge 44 and the port 40 is of smaller dimension than the space between the leading edge 46 of the second piston and the second port 42.

With this arrangement, the first piston 22 and the pressure chamber 26 are effective to seal port 40 and force braking fluid through outlet 28 to the rear brakes while the second port 42 is still open and the front brakes remain unenergized. This condition arises during low pedal pressure when the vehicle is being brought to a halt while rolling at a low speed. The rear brakes are effective to perform the braking operation while the second pressure chamber of the front brakes remains open to atmospheric pressure through the reservoir and unpressurized.

In this way, the unpleasant squeaking of the front wheel brakes which occurs at low speeds and low pedal pressures is avoided.

It is to be understood that the present invention is not limited to the construction shown but that various embodiments are possible without leaving the scope and spirit of the invention.

I claim:

1. A brake master cylinder assembly for a brake system having front wheel brakes and rear wheel brakes, said assembly having a housing with a constant diameter bore, a partition dividing said bore into a first pressure chamber and a second pressure chamber, said first and second pressure chambers each having outlet means constructed to be connected to said rear and front brakes respectively, said housing having first and second reservoir chambers connected to said first and second pressure chambers, a first port in the wall of said first pressure chamber connecting it with said first reservoir chamber, a second port in the wall of said second pressure chamber connecting it with said second reservoir chamber, hydraulic fluid in said reservoirs and pressure chambers for energizing said wheel brakes, first and second pistons axially slidable within said first and second pressure chambers respectively and constructed to seal said first and second ports respectively and to force fluid from said first and second pressure chambers through said outlet means to said rear and front brakes respectively, means rigidly interconnecting said first and second pistons and constructed to slide said pistons conjointly in their respectively pressure chambers, said second port being spaced from said second piston by an amount slightly greater than the spacing between said first port and said first piston whereby said first port closes just prior to the closing of said second port upon axial displacement of said pistons so that there will be a pressure buildup in said first pressure chamber before said second pressure chamber.

2. A brake master cylinder assembly for a brake system having front wheel brakes and rear wheel brakes, said assembly having a housing with an elongated bore, a partition dividing said bore into a first pressure chamber and a second pressure chamber, said first and second pressure chambers each having outlet means constructed to be connected to said rear and front brakes respectively, said housing having first and second reservoir chambers connected to said first and second pressure chambers, a first port in the wall of said first pressure chamber connecting it with said first reservoir chamber, a second port in the wall of said second pressure chamber connecting it with said second reservoir chamber, hydraulic fluid in said reservoirs and pressure chambers for energizing said wheel brakes, first and second pistons axially slidable within said first and second pressure chambers respectively and constructed to seal said first and second ports respectively and to force fluid from said first and second pressure chambers through said outlet means to said rear and front brakes respectively, means rigidly interconnecting said first and second pistons conjointly in their respective pressure chambers, said second port being spaced from said second piston by an amount slightly greater than the spacing between said first port and said first piston whereby said first port closes just prior to the closing of said second port upon axial displacement of said pistons.

References Cited by the Examiner
UNITED STATES PATENTS 3,147,596   9/64   Wallace _____ 60—54.6

FOREIGN PATENTS 460,676   12/50   Italy.

SAMUEL LEVINE, *Primary Examiner.*

ROBERT R. BUNEVICH, *Examiner.*